United States Patent
Bolotin et al.

(10) Patent No.: US 10,873,374 B2
(45) Date of Patent: Dec. 22, 2020

(54) ENHANCED ACKNOWLEDGMENT AND POWER SAVING FOR WIRELESS COMMUNICATIONS

(71) Applicant: Intel Corporation, Santa Clara, CA (US)

(72) Inventors: Ilya Bolotin, Nizhny Novgorod (RU); Cheng Chen, Portland, OR (US); Oren Kedem, Modiin Maccabim-Reut (IL); Artyom Lomayev, Nizhny Novgorod (RU); Alexander Maltsev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/866,762

(22) Filed: May 5, 2020

(65) Prior Publication Data
US 2020/0350961 A1   Nov. 5, 2020

Related U.S. Application Data

(63) Continuation of application No. 16/169,917, filed on Oct. 24, 2018, now Pat. No. 10,644,765.
(Continued)

(51) Int. Cl.
*H04B 7/04* (2017.01)
*H04B 7/0452* (2017.01)
(Continued)

(52) U.S. Cl.
CPC ......... *H04B 7/0452* (2013.01); *H04B 7/0623* (2013.01); *H04L 1/0003* (2013.01);
(Continued)

(58) Field of Classification Search
CPC .. H04B 7/0452; H04B 7/0623; H04B 7/0426; H04L 1/0003; H04L 1/0009;
(Continued)

(56) References Cited

U.S. PATENT DOCUMENTS

2015/0131582 A1* 5/2015 Nam ................. H04W 72/0406
370/329
2016/0374097 A1* 12/2016 Han ..................... H04L 41/069
(Continued)

*Primary Examiner* — Freshteh N Aghdam
(74) *Attorney, Agent, or Firm* — Eversheds Sutherland (US) LLP

(57) ABSTRACT

This disclosure describes systems, methods, and devices related to using enhanced acknowledgment and power save. A device may determine a multi-user (MU) multiple-input multiple-output (MIMO) frame associated with a MU-MIMO group. The device may determine a first portion of the MU-MIMO frame associated with the first station device of the MU-MIMO group, wherein the first portion comprises a first indication of a first time offset associated with the first station device. The device may determine a second portion of the MU-MIMO frame associated with the second station device of the MU-MIMO group, wherein the second portion comprises a second indication of a second time offset associated with the second station device. The device may cause to send the MU-MIMO frame to the MU-MIMO group. The device may identify a first acknowledgment from the first station device based on the first time offset.

20 Claims, 12 Drawing Sheets

Related U.S. Application Data

(60) Provisional application No. 62/581,515, filed on Nov. 3, 2017, provisional application No. 62/576,468, filed on Oct. 24, 2017.

(51) Int. Cl.
| | |
|---|---|
| *H04B 7/06* | (2006.01) |
| *H04W 72/04* | (2009.01) |
| *H04L 1/00* | (2006.01) |
| *H04L 1/16* | (2006.01) |
| *H04L 1/18* | (2006.01) |
| *H04W 52/02* | (2009.01) |
| *H04B 7/0426* | (2017.01) |

(52) U.S. Cl.
CPC .......... *H04L 1/0009* (2013.01); *H04L 1/1614* (2013.01); *H04L 1/1621* (2013.01); *H04L 1/1854* (2013.01); *H04W 52/0225* (2013.01); *H04W 72/0446* (2013.01); *H04B 7/0426* (2013.01)

(58) Field of Classification Search
CPC ... H04L 1/1614; H04L 1/1621; H04L 1/1854; H04W 52/0225; H04W 72/0446
See application file for complete search history.

(56) References Cited

U.S. PATENT DOCUMENTS

| | | | |
|---|---|---|---|
| 2017/0064696 A1* | 3/2017 | He | H04W 4/70 |
| 2018/0302820 A1* | 10/2018 | Heo | H04L 5/0055 |
| 2019/0068271 A1* | 2/2019 | Lou | H04B 17/12 |
| 2019/0173621 A1* | 6/2019 | Sun | H04W 76/11 |

* cited by examiner

ENHANCED ACKNOWLEDGMENT AND POWER SAVING FOR WIRELESS COMMUNICATIONS

CROSS-REFERENCE TO RELATED APPLICATION(S)

This application is a continuation of U.S. patent application Ser. No. 16/169,917, filed Oct. 24, 2018, which claims the benefit of U.S. Provisional Application No. 62/576,468, filed Oct. 24, 2017, and U.S. Provisional Application No. 62/581,515, filed Nov. 3, 2017, the disclosures of which are incorporated herein by reference as if set forth in full.

TECHNICAL FIELD

This disclosure generally relates to systems and methods for wireless communications and, more particularly, to enhanced acknowledgment and power saving for wireless communications.

BACKGROUND

Wireless devices are becoming widely prevalent and are increasingly requesting access to wireless channels. Wireless devices may improve performance through efficient transmissions and controls.

DETAILED DESCRIPTION

Figure 1A:
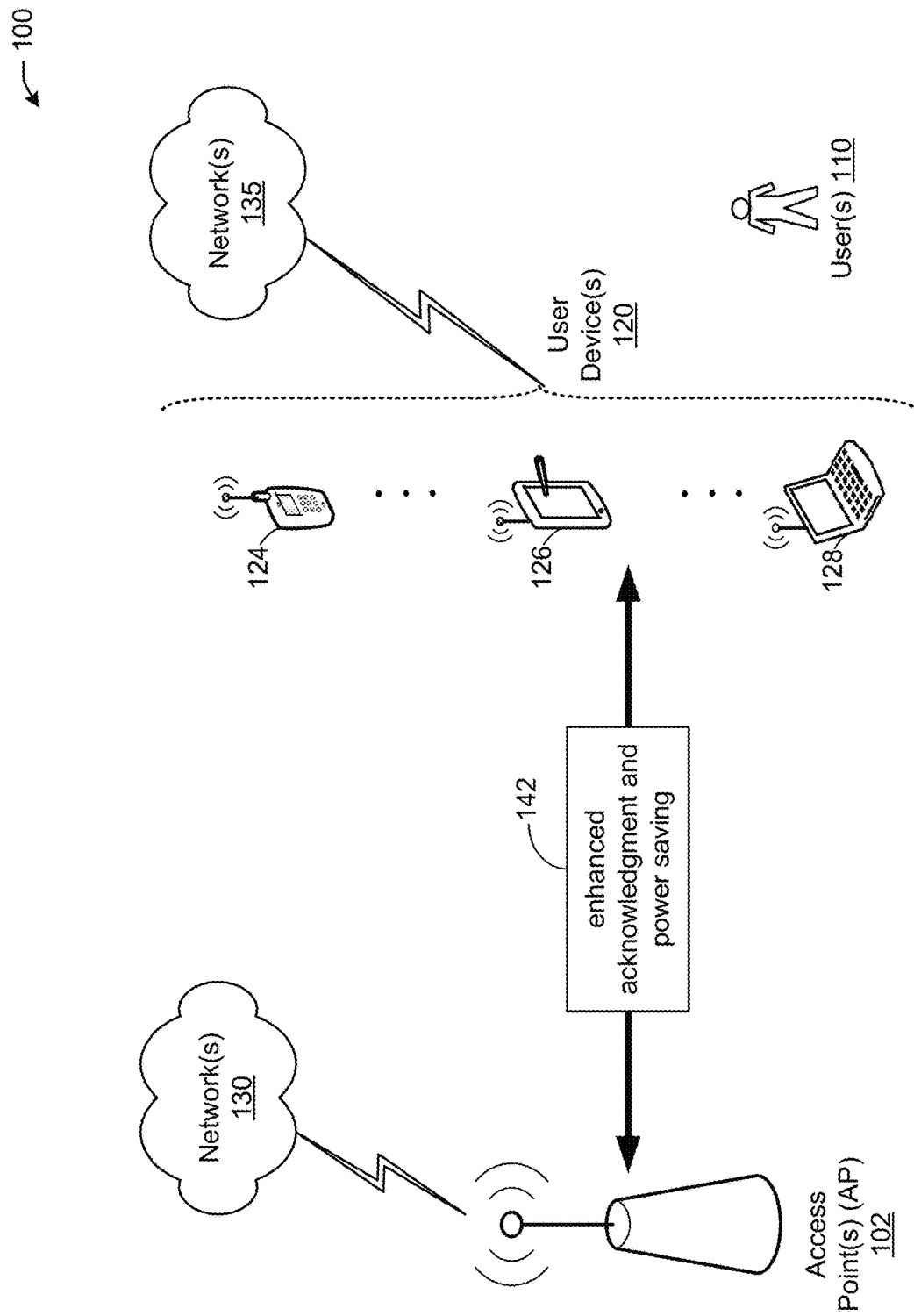
FIG. 1A depicts a network diagram illustrating an example network environment, according to some example embodiments of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in or substituted for, those of other embodiments. Embodiments set forth in the claims encompass all available equivalents of those claims.

The IEEE 802.11ad standard, also known as WiGig, is evolving into a new IEEE 802.11ay standard in a millimeter wave (mmWave) band (e.g., 60 GHz). A physical (PHY) layer of IEEE 802.1 lay may suggest a multi-gigabit throughput achieved using large bandwidth and multi-user multiple input, multiple output (MU-MIMO). Theoretically, MU-MIMO using eight streams may increase an access point (AP) throughput eight times, but AP throughput may be reduced by large medium access control (MAC) overhead caused by an existing acknowledgment flow. This acknowledgment overhead may achieve 95% of a duration of one MU cycle (e.g., an MU frame transmission and acknowledgment). Another significant problem in the evolution to IEEE 802.11ay may be power consumption. An effective power save solution, therefore, may be implemented for an MU-MIMO transmission flow.

Existing solutions may consider a transmission of an MU frame to several stations (STAs), and then polling each of the STAs sequentially for acknowledgment. Alternatively, a block association request/block association (BAR/BA) order may be the same as association identifiers (AIDs), which may appear in a group description present in an enhanced digital multi-gigabit (EDMG) Group ID Set element corresponding to an MU group. The ordered BAR/BA exchange sequence may enable each STA to know when the STA should wake up to receive the corresponding BAR frame addressed to the STA. This may allow STAs to be in a power save mode for up to 86% of a duration of an MU-MIMO transmission and acknowledgment period.

Existing MU-MIMO acknowledgment and power save flows may have the following issues. A BAR/BA exchange may cause large overhead increasing the duration of one MU cycle, and therefore may significantly reduce throughput. The overhead may achieve 95% of a duration of one MU cycle. A power save approach may limit an MU-MIMO acknowledgment flow to only one case: when all STAs are requested for BA after each MU PPDU. This approach may not allow the use of a flow in which an AP requests a BA from only one STA after each MU PPDU, thereby reducing the acknowledgment overhead. In addition, an MU-MIMO power save may be based on an assumption that all STAs transmit the smallest BA, which may not be accurate when BAs of bigger size are used. These issues may be addressed by the example embodiments described herein.

IEEE 802.11ay task group started development of the new standard in the mmWave (60 GHz) band which is an evolution of the IEEE 802.11ad standard also known as WiGig. IEEE 802.11ay proposes to increase the transmission data rate by applying Multiple Input Multiple Output (MIMO) and channel bonding techniques.

802.11ay makes use of the unlicensed 60 GHz mmWave frequency band. The wideband frequency and its directivity nature make it attractive for service providers who want to deliver high-speed internet to residential houses. This kind of network is built with many nodes communicating with each other creating a distributed mesh network. One of the methods to allocate link access in those controlled networks is by dividing the medium between uplink and downlink slots and further dividing each of the slots into several TDD-SPs (time division duplex service period). The TDD-SPs are allocated to different stations allowing the controlled link access to be managed by a central server and operator. In each of the TDD-SPs, the station may transmit or receive but not both. This method of allocating the medium helps mitigate interferences among stations. This method is also known by the name TDD (Time Division Duplex). In order to manage the network per traffic usage, service level agreement, network load, etc., the central controller needs to send and receive management messages that collect the bandwidth request from the stations and allocate the bandwidth of the network. Bandwidth allocation is done by assigning uplink and downlink TDD-SPs to specific users.

One of the most significant features of the new standard is support of MU-MIMO. To increase its efficiency and to reduce the overhead caused by long acknowledgment procedure the MU-MIMO acknowledgment flow considers that STAs transmit their acknowledgments in scheduled periods.

On the other hand, IEEE 802.1 lay proposes several new use cases to be supported in the future standard and one of them is "mmWave Distribution Networks" which considers that all transmissions in the network including the acknowledgments are slotted. Both of the mentioned cases require new Ack policy, which will indicate the transmission of acknowledgments in the scheduled slots.

Now, 802.11ad stations support three types of Ack policy indication (two bits available):

00—Implicit Block Ack Request. The addressed recipient returns a BlockAck frame SIFS after the physical layer convergence protocol (PLCP) data unit (PPDU) carrying the QoS Data frames.

10—No Ack. The recipient will not transmit the acknowledgment in response to the frame.

11—Block Ack. The addressed recipient takes no action upon the receipt of the frame except for recording the state. The recipient returns BlockAck frame short inter-frame space (SIFS) after BlockAckReq frame or implicit block ack request in the future.

The existing solutions do not consider the acknowledgment procedure in a scheduled timeslot. The usage of the existing Ack policy indications in the cases with scheduled acknowledgment may confuse EDMG STAs.

Example embodiments described herein provide certain systems, methods, and devices for enhanced acknowledgment and power save for the IEEE 802.11 family of standards, including the IEEE 802.11ay standard.

In one or more embodiments, an enhanced acknowledgment and power saving system may facilitate a new procedure for MU-MIMO acknowledgment and power save. The enhanced acknowledgment and power saving may facilitate the removal of BAR frames and BA transmission according to a defined (e.g., explicitly or implicitly) schedule. Power save may also follow the schedule.

In one or more embodiments, an enhanced acknowledgment and power saving system may facilitate that BAR frames may be removed from an acknowledgment flow in order to reduce overhead. STAs may transmit their BA during time slots scheduled by a personal basic service set control point (PCP) AP (PCP/AP) for each STA.

In one or more embodiments, an enhanced acknowledgment and power saving system may facilitate that a PCP/AP (e.g., PCP/AP 302) may schedule time slots for a BA transmission for each STA considering knowledge about the BA type for each STA and that BAs may be transmitted with the lowest modulation and coding scheme (MCS). A PCP/AP may inform each STA of the STA's respective BA Transmission Time (BATT) by including scheduling information into the same MU PPDU.

In one or more embodiments, an enhanced acknowledgment and power saving system may facilitate additional information in the MU-PPDU to indicate to the STAs timing associated with a next MU-PPDU that may be sent by the PCP/AP.

In one or more embodiments, an enhanced acknowledgment and power saving system may facilitate each STA may implement a power save mode after receiving an MU PPDU (e.g., an "end of frame" detection may be used for earlier receiver stop). The STA may wake up for BA transmission, and may return to a power save mode again until the time defined by AP (e.g., until the next MU PPDU transmission). The STA may follow the scheduling information and may wake up exactly for the STA's BA transmission and MU PPDU reception, thereby performing power save in an effective and accurate way.

In one or more embodiments, an enhanced acknowledgment and power saving system may facilitate that scheduling information delivered from a PCP/AP to an STA may be specific to an STA, and may include a BATT Start offset, which may indicate a beginning of time slot provided by the PCP/AP for an STA to transmit the STA's BA.

In one or more embodiments, an enhanced acknowledgment and power saving system may facilitate scheduling information delivered from a PCP/AP to an STA may be specific to an STA, and may include a next PPDU Start offset, which may indicate the moment when an STA should begin listening to/for the PCP/AP. At this moment, the PCP/AP may either start transmitting the next MU PPDU in a current sequence of an MU-MIMO transmission or may transmit a BAR to an STA if a solicited BA was not received.

In one or more embodiments, an enhanced acknowledgment and power saving system may significantly reduce acknowledgment overhead, providing outstanding throughput gains (e.g., up to 750%) compared to legacy procedures.

In one or more embodiments, an enhanced acknowledgment and power saving system may allow an STA to perform a power save in a most effective and accurate way that may yield a 76% reduction of STA awake time compared to legacy procedures.

A directional multi-gigabyte (DMG) communications may involve one or more directional links to communicate at a rate of multiple gigabits per second, for example, at least 1 gigabit per second, 7 gigabits per second, or any other rate. An amendment to a DMG operation in a 60 GHz band, e.g., according to an IEEE 802.11ad standard, may be defined, for example, by an IEEE 802.11ay project.

In some demonstrative embodiments, one or more devices may be configured to communicate over a next generation 60 GHz (NG60) network, an enhanced DMG (EDMG) network, and/or any other network. For example, the one or more devices may be configured to communicate over the NG60 or EDMG networks.

In one embodiment, an enhanced acknowledgment policy system may define a new Ack policy indication for scheduled acknowledgment in IEEE 802.11ay. The enhanced acknowledgment policy system may make the Ack policy comprehensible for EDMG stations.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1A depicts a network diagram illustrating an example network environment, according to some example embodiments of the present disclosure. Wireless network 100 may include one or more user devices 120 and one or more responding device(s) (e.g., AP 102), which may communicate in accordance with IEEE 802.11 communication standards. The user device(s) 120 may be mobile devices that are non-stationary (e.g., not having fixed locations) or may be stationary devices.

Figure 8:
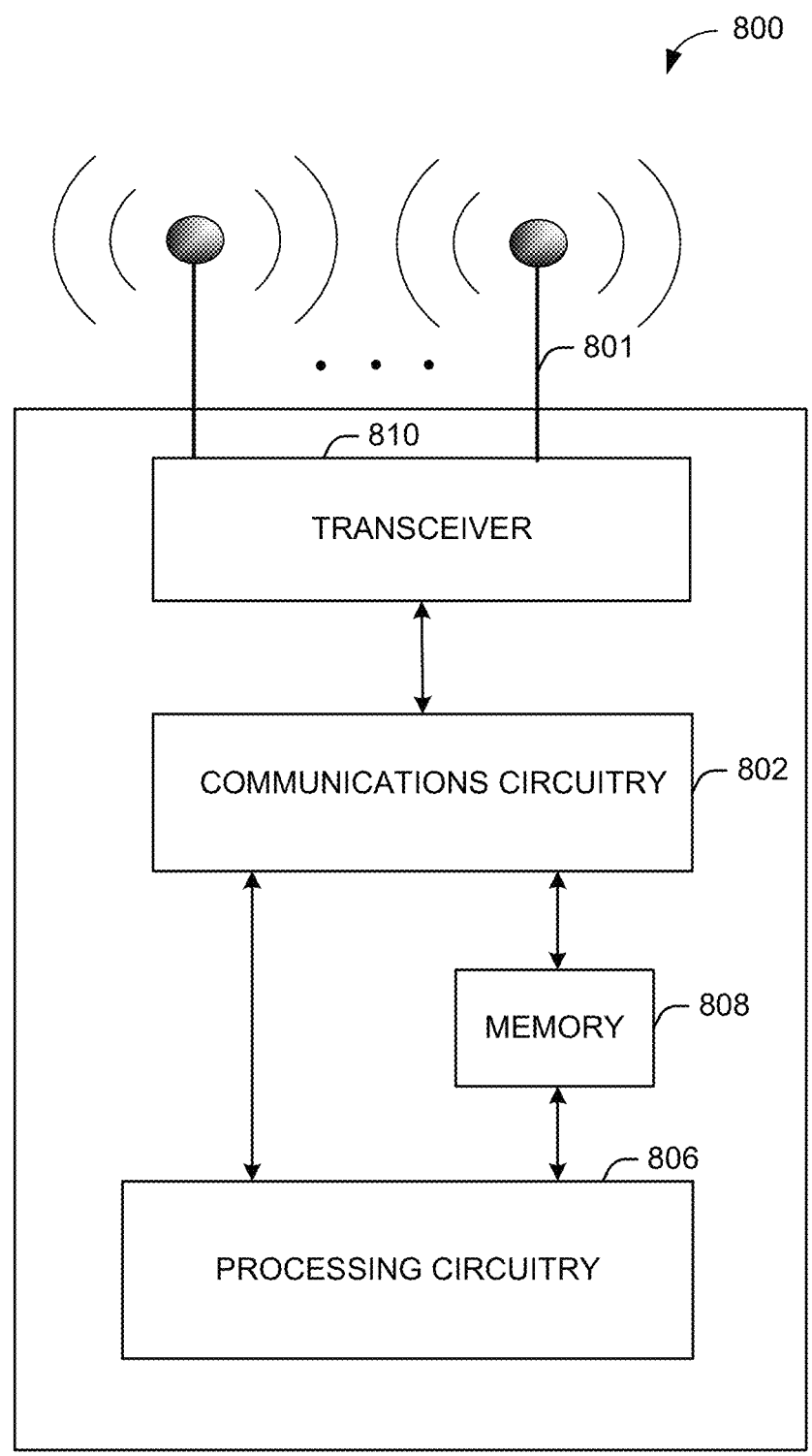
FIG. 8 illustrates a functional diagram of an example communication station that may be suitable for use as a user device, in accordance with one or more example embodiments of the present disclosure.
Figure 9:
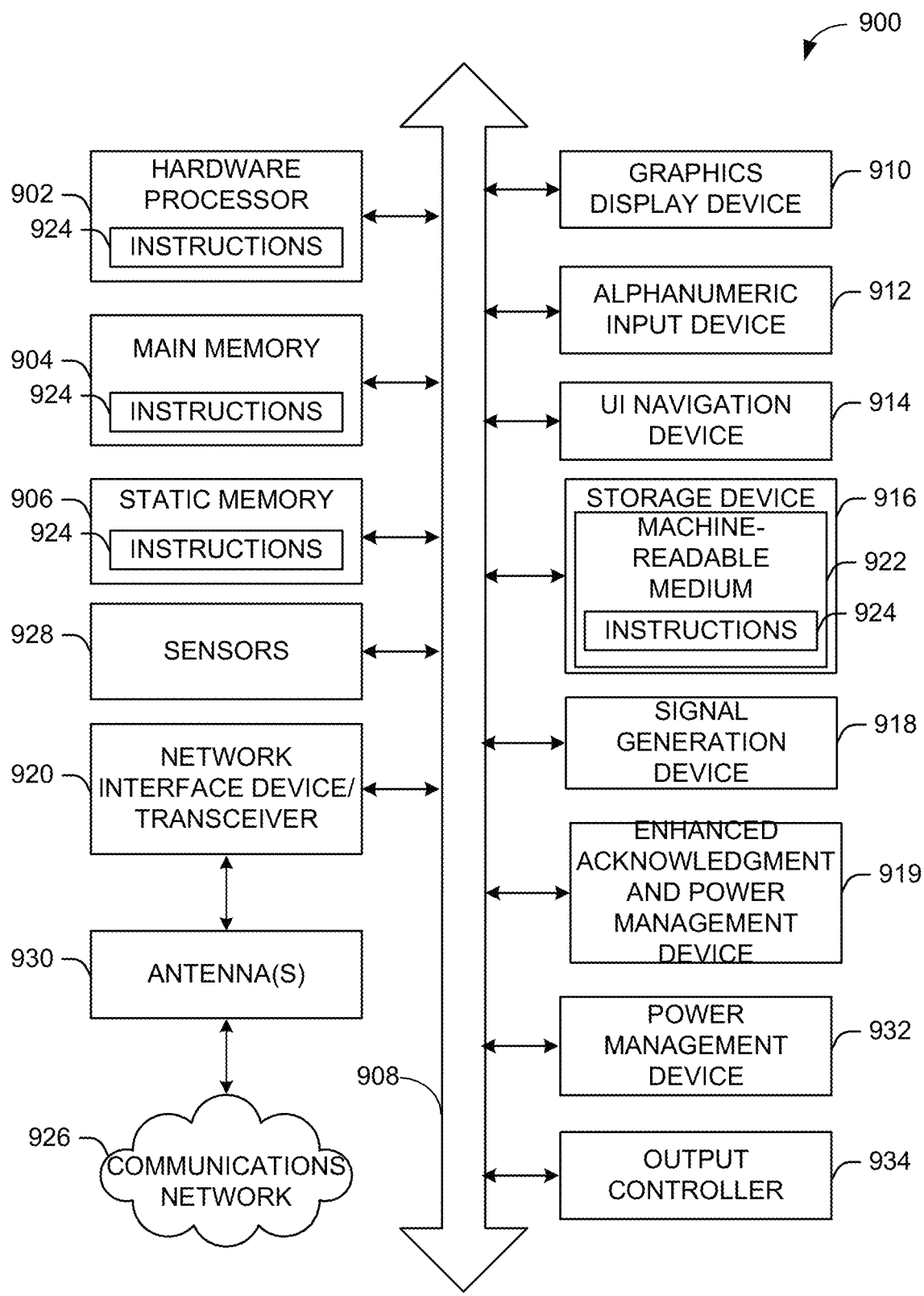
FIG. 9 is a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 8 and/or the example machine/system of FIG. 9.

One or more illustrative user device(s) 120 and/or AP(s) 102 may be operable by one or more user(s) 110. It should be noted that any addressable unit may be a station (STA). An STA may take on multiple distinct characteristics, each of which shapes its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device (s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an ultrabook computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., directional multi-gigabit (DMG) antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

Multiple Input, Multiple Output (MIMO) beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHz channels (e.g., 802.11ad, 802.11ay). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

When an AP (e.g., AP 102) establishes communication with one or more user devices 120 (e.g., user devices 124, 126, and/or 128), the AP 102 may communicate in a downlink direction and the user devices 120 may communicate with the AP 102 in an uplink direction by sending frames in either direction. The user devices 120 may also communicate peer-to-peer or directly with each other with or without the AP 102. The frames may be preceded by one or more preambles that may be part of one or more headers. These preambles may be used to allow a device (e.g., AP 102 and/or user devices 120) to detect a new incoming data frame from another device. A preamble may be a signal used in network communications to synchronize transmission timing between two or more devices (e.g., between the APs and user devices).

The IEEE 802.11 standard defines various frame types that devices may use for communications as well as managing and controlling the wireless link. These frame types may include data frames or signaling frames. The signaling frames may be divided into control frames and management frames. Management frames enable devices to establish and maintain communications. Some examples of management frames may include, but are not limited to, fine timing measurement frame, authentication frames, association request frame, association response frame, beacon frame, etc. Control frames may assist in the delivery of data frames between devices. Some examples of control frames may include, but are not limited to, request to send frame, clear to send frame, acknowledgment frame, etc.

Typically, control frames have limited and simpler structures than management frames. Meaning that baseband processing may process control frames using a simpler procedure, resulting in faster processing. However, control frames are less flexible than management frames.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

In one embodiment, and with reference to FIG. 1A, when an AP (e.g., AP(s) 102) establishes communication with one or more user devices 120 (e.g., user devices 124, 126, and/or 128), the AP 102 may communicate in a downlink direction and the user devices 120 may communicate with the AP 102 in an uplink direction by sending frames in either direction.

In one or more embodiments, the AP 102 and the one or more user devices 120 may implement an enhanced acknowledgment and power saving during MU-MIMO communications.

It is understood that the above descriptions are for purposes of illustration and are not meant to be limiting.

Figure 1B:
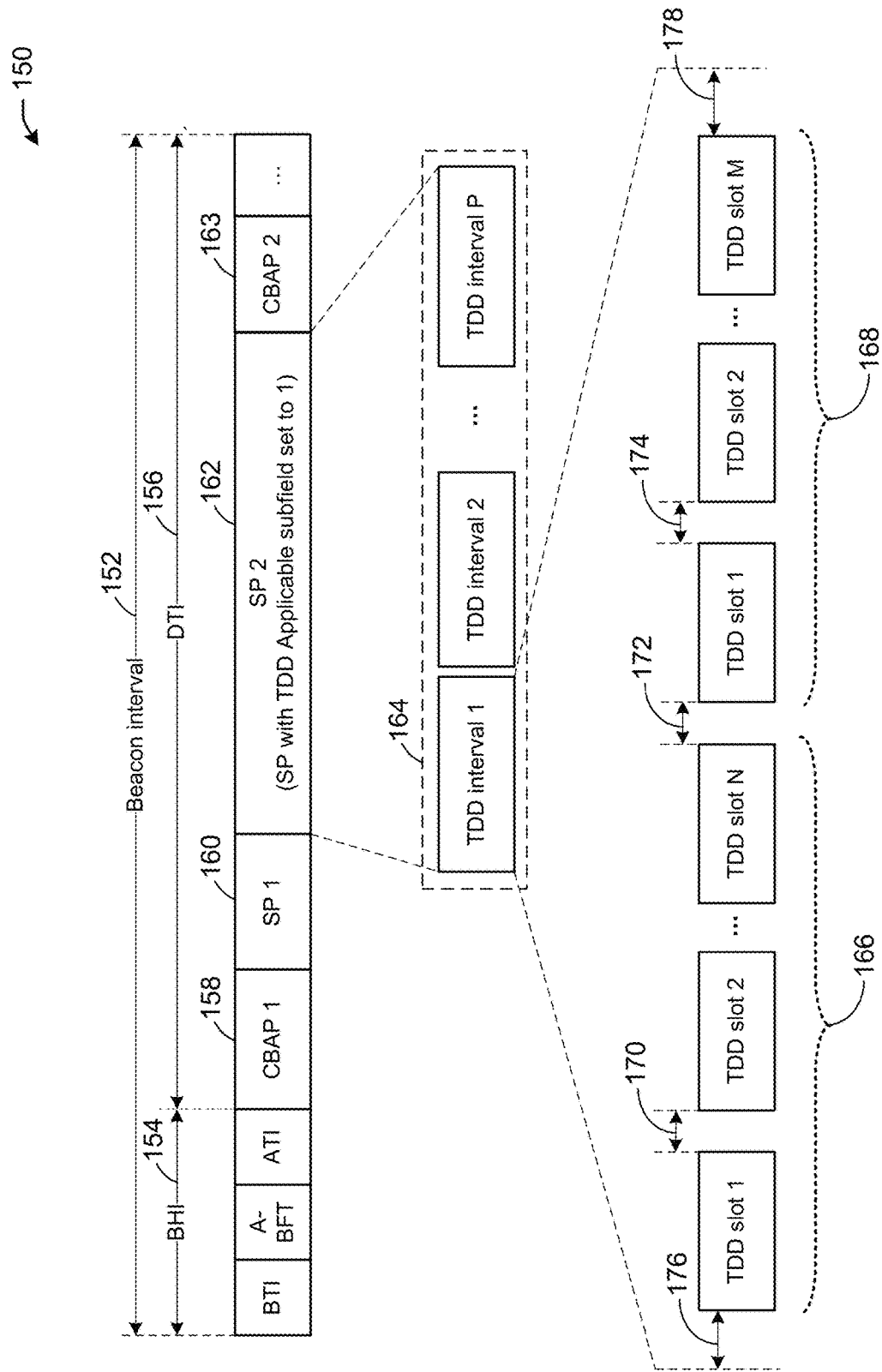
FIG. 1B depicts a network diagram illustrating an example network environment, according to some example embodiments of the present disclosure.

FIG. 1B depicts an illustrative schematic diagram 150 for an enhanced acknowledgment policy system, in accordance with one or more example embodiments of the present disclosure.

Referring to FIG. 1B, there is shown an example of Beacon interval with SP with time division duplex (TDD) channel access.

In one embodiment, the mmWave distribution network use case defines the new type of allocation which is slotted—service period with TDD channel access. An example of beacon interval with service period (SP) with TDD channel access is shown in FIG. 1B. In this allocation, downlink and uplink transmissions are separated into different slots.

Referring to FIG. 1B, there is shown a beacon interval 152 that may be comprised of a beacon header interval (BHI) 154 and a data transmission interval (DTI) 156. The BHI 154 comprises a beacon time interval (BTI), an association beamforming training (A-BFT) interval, and an announcement transmission interval (ATI). The DTI 156 may be comprised of a contention based access period (CBAP 1) 158, a first service period (SP 1) 160, a second service period (SP 2) 162, and a second CBAP 2 163. The SP 2 162 may be an enhanced SP, in accordance with one or more embodiments of the disclosure. Although this example shows that there are four allocation periods (e.g., CBAP 1 158, SP 1 160, SP 2 162, and CBAP 2 163), the AP may allocate additional allocation periods as needed. In addition, each of these allocation periods may be indicated in the allocation control field of an extended schedule element.

In one or more embodiments, a new enhanced type of SP (e.g., SP 2 162) may be defined with time division data (TDD) access and may be dedicated to mmWave distribution networks where the AP and STAs may perform downlink and uplink communications. For example, the SP 2 162 may comprise one or more TDD intervals 164, where each of the one or more TDD intervals 164 may be comprised of two groups of TDD slots (e.g., TDD slots 166 and TDD slots 168). The TDD slots 166 may be simplex transmit (TX) TDD slots and the TDD slots 168 may be simplex receive (RX) TDD slots. That is, the one or more of the TDD slots 166 may be used to send downlink data from an AP/PCP to one or more STAs while the TDD slots 168 may be used to send uplink data from one or more STAs to an AP/PCP. The TDD slots 166 may include N TDD slots, where N is a positive integer. The TDD slots 168 may include M TDD slots, where M is a positive integer. In essence, the TDD slots 166 and the TDD slots 168 include uplink and downlink TDD slots that may be used by the AP/PCP and/or one or more STAs. Further, there may be a time gap between each pair of TDD slots (e.g., gaps 170, 172, and 174). These time gaps may be added between the TDD slots as guard gaps to prevent interference between two consecutive TDD slots. These gaps may have equal time durations or may vary based on the type of TDD slot. For example, the gap 172 between a TX TDD slot and an RX TDD slot may be the same as the gap 170 or may be different. This may also be configurable by the network and/or by the system administrator. Further, at the beginning and end of the list of TDD slots, there may be a gap 176 and a gap 178 respectively. These beginning and end gaps may also be the same as the gaps between two consecutive TDD slots or may be different based on implementation.

The above requires an indication for STAs that the acknowledgment for the frames transmitted to them should be sent in the scheduled slots. The Ack policy indications used in 802.11ad cannot solve this problem: the acknowledgment is required (Ack Policy=10 does not match), it should not be sent immediately (Ack Policy=00 does not match), no BAR frames will be transmitted (Ack Policy=11 does not match).

802.11 standard defines "Ack Policy subfield=01" as power save multi-poll (PSMP) Ack. It is used in PSMP protocol which is not used in 802.11ad.

In one embodiment, an enhanced acknowledgment policy system may facilitate the use of power save multi-poll (PSMP) protocol for acknowledgment. For example, Ack Policy subfield=01 may indicate Scheduled BlockAck transmission. That means that STA which receives quality of service (QoS) Data frame with Ack Policy subfield=01 will return a BlockAck frame during the scheduled time slot. The scheduling of this time slot may be done either implicitly by any pre-defined rule or explicitly by sending the exact time period to STA in the additional frame at the same PPDU.

It is understood that the above descriptions are for purposes of illustration and are not meant to be limiting.

Figure 2:
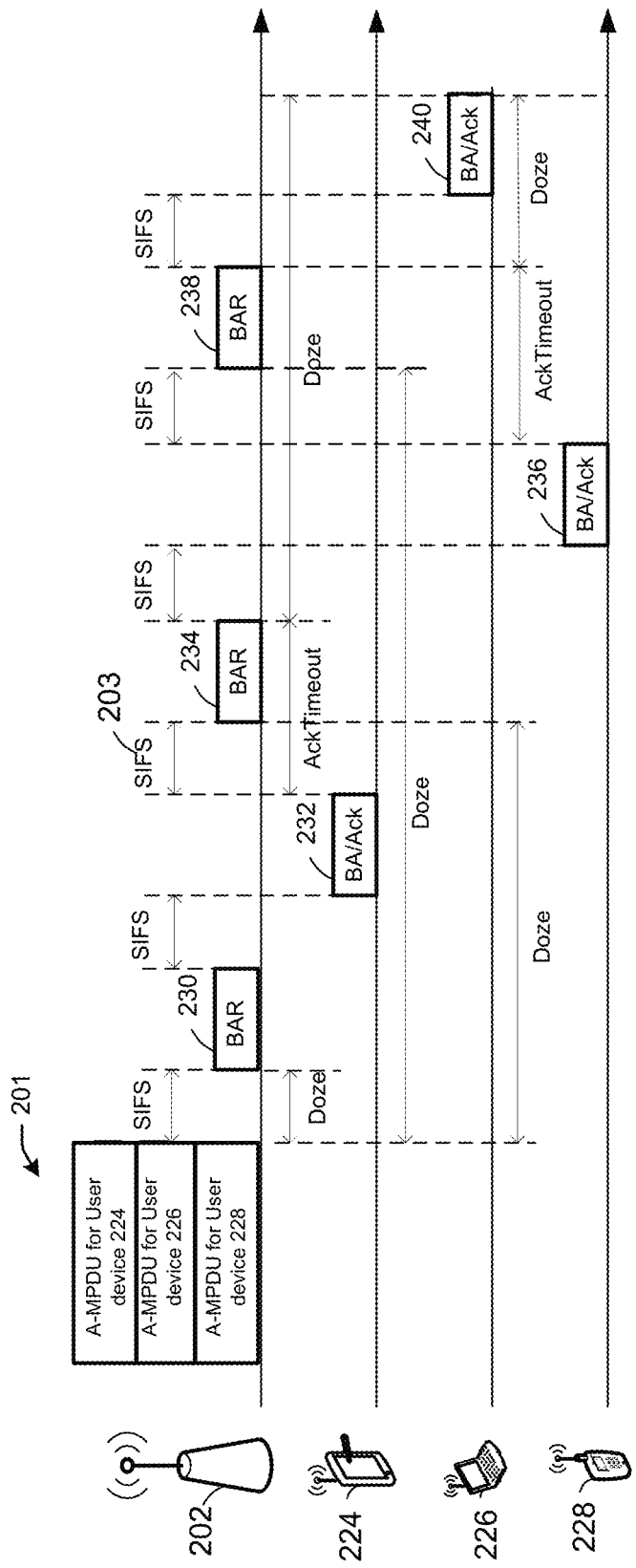
FIG. 2 illustrates an acknowledgment and power save sequence, according to some example embodiments of the present disclosure.

FIG. 2 illustrates an acknowledgment and power save sequence 200, according to some example embodiments of the present disclosure.

Referring to FIG. 2, there is shown a PCP/AP 202 that is communicating with three STAs (e.g., user devices 224, 226, 228) in an MU MIMO communication.

The PCP/AP 202 may transmit an MU-PPDU packet which is addressed to these STAs. After that, the PCP/AP 202 starts polling each STA for acknowledgment. For example, the PCP/AP 202 may send MU-MPDU 201 to the three STAs (e.g., user devices 224, 226, 228). User device 224 may receive its portion of the MU-PPDU 201. The PCP/AP 202 may then request for acknowledgment by sending BAR 230 to the user device 224. The user device 224 may then, upon receiving the BAR 230, send a block acknowledgment or an acknowledgment frame (e.g., BA/Ack 232). When the PCP/AP 202 receives the BA/ACK 232 from the user device 224, the PCP/AP 202 may wait for a channel access period (e.g., a short inter-frame space (SIFS) time 203) to send a BAR 234 to the user device 228 requesting an acknowledgment to the portion of the MU-PPDU 201 that is destined for the user device 228. The user device 228 may then send a BA/ACK 236 in response to the BAR 234. The PCP/AP 202 may then send a BAR 238 to the user device 226 requesting acknowledgment to the portion of the MU-PPDU 201 that is destined for the user device 226. The user device 226 may then respond with a BA/ACK 240.

The PCP/AP 202 cannot send the MU-PPDU 201 and then let the user devices acknowledge whenever they receive their portions of the MU-PPDU 201 because of a high probability that the acknowledgments from these user devices will cause interference and collisions on the PCP/AP's side.

A BAR/BA exchange as shown in FIG. 2 may cause large overhead increasing a duration of one MU cycle, and therefore may significantly reduce throughput.

In one or more embodiments, an acknowledgment and power save sequence may limit an MU-MIMO acknowledgment flow to only one case in which all STAs may be requested for a block acknowledgment after each MU PHY protocol data unit (MU-PPDU).

In one or more embodiments, each STA calculates when it can go into power save mode. For example, user device 224 may go to power save mode, it will calculate when it will receive a BAR 230 and goes into power save mode until that time. The STA considers the shortest time to receive the BAR 230, which in this case is SIFS. The user device 224 already knows that it will be the first on the list based on information exchanged with the PCP/AP 202 during the MU-MIMO group setup. The user device 228 knows that it's going to be the second in the list that has to provide a block acknowledgment (e.g., BA/Ack 236) after it receives the BAR 234 from the PCP/AP 202. The user device 228 calculates the time that it needs to wake up from its doze state (power save mode). Since the user device 228 knows that before it receives its BAR from the PCP/AP 202, there will be a BAR associated with the first device on the list which is, in this case, the user device 224, a BA from the user device 224, following that there should be a BAR associated with the user device 228. Considering that the minimal time frames are SIFS, the user device 228 will be capable of determining when to wake up.

This procedure is not very accurate because there are inefficiencies in when a user device should wake up because this is based on the minimal time that frames are expected to be sent and the user device test account a large enough time to ensure that it wakes up around the same time it receives a BAR from the PCP/AP. There are additional assumptions that are used in this procedure. For example, the procedure assumes that all user devices will transmit their acknowledgments.

The power save procedure may be based on an assumption that all STAs transmit a minimum BA, which may not be accurate in cases when BAs of larger size are used.

It is understood that the above descriptions are for purposes of illustration and are not meant to be limiting.

Figure 3:
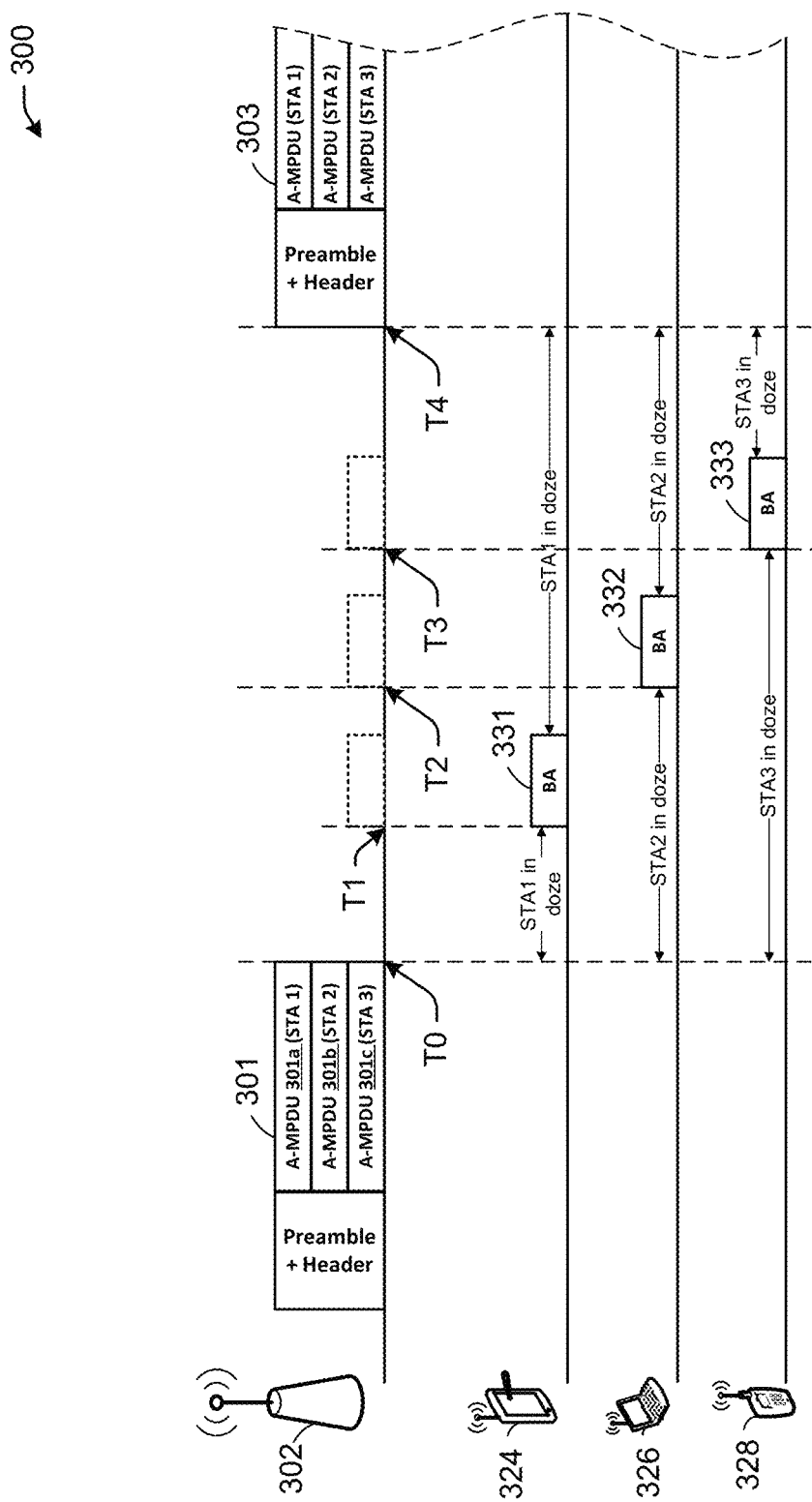
FIG. 3 illustrates an acknowledgment and power save sequence, in accordance with one or more example embodiments of the present disclosure.

FIG. 3 illustrates an acknowledgment and power save sequence 300, in accordance with one or more example embodiments of the present disclosure.

Referring to FIG. 3, there is shown in PCP/AP 302 communicating with three STAs (e.g., user device 324 (STA1), user device 326 (STA2), user device 328 (STA3)). The PCP/AP 302 may send a frame (e.g., MU-PPDU 301). The MU-PPDU 301 may be composed of a preamble, a header, and one or more Aggregated MAC protocol data unit (A-MPDU), where each A-MPDU is a grouping of MPDUs that are destined for a specific STA. For example, A-MPDU 301*a* may be destined to STA1, A-MPDU 301*b* may be destined to STA2, and A-MPDU 301*c* may be destined to STA3.

In one or more embodiments, BAR frames may be removed from an acknowledgment flow in order to reduce overhead. STAs may transmit their BA during time slots scheduled by a personal basic service set control point (PCP) AP (PCP/AP) for each STA. For example, the PCP/AP 302 may send the MU-PPDU 301 without having to rely on sending BAR frames to induce the STAs, belonging to the MU-MIMO group, to send their acknowledgments. Instead, the PCP/AP 302 may facilitate sending information associated with each STA's acknowledgment and related timing.

In one or more embodiments, a PCP/AP (e.g., PCP/AP 302) may schedule time slots for a BA transmission for each STA considering knowledge about the BA type for each STA and that BAs may be transmitted with the lowest modulation and coding scheme (MCS). A PCP/AP may inform each STA of the STA's respective BA Transmission Time (BATT) by including scheduling information into the same MU PPDU. That is the PCP/AP 302 may include scheduling information in the portion of the MU-PPDU that is intended for a specific STA (e.g., STA1, STA2, STA3). For example, A-MPDU 301*a* may include scheduling information for STA1, A-MPDU 301*b* may include scheduling information for STA2, A-MPDU 301*c* may include scheduling information for STA3.

In one or more embodiments, additional information may be included in the MU-PPDU 301 to indicate to the STAs timing associated with a next MU-PPDU (e.g., MU-PPDU 303) that may be sent by the PCP/AP 302. In the example of FIG. 3, the MU-PPDU 301 may include information associated with time T1, T2, T3, and T4, where T1 is a time offset for STA1 to send its acknowledgment (e.g., BA 331), T2 is a time offset for STA2 to send its acknowledgment (e.g., BA 332), T3 is a time offset for STA3 to send its acknowledgment (e.g., BA 333), and T4 is a time offset for the PCP/AP 302 to send a next MU-PPDU 303.

In one or more embodiments, each STA may implement a power save mode after receiving an MU PPDU (e.g., an "end of frame" detection may be used for earlier receiver stop). The STA may wake up for BA transmission, and may return to a power save mode again until the time defined by AP (e.g., until the next MU PPDU transmission). The STA may follow the scheduling information and may wake up exactly for the STA's BA transmission (e.g., BAs 331, 332, 333) and MU PPDU reception, thereby performing power save in an effective and accurate way. For example, PCP/AP 302 may indicate to STA2 in A-MPDU 301*b* an offset value that indicates to the STA2 at which moment (e.g., T2) it should start transmitting its block acknowledgment frame (e.g., BA 332). Similarly, the PCP/AP 302 may indicate to STA1 in A-MPDU 301*a* an offset value that indicates to the STA1 at which moment (e.g., T1) it should start transmitting its block acknowledgment frame (e.g., BA 331). Further, the PCP/AP 302 may indicate to STA3 in A-MPDU 301*c* an offset value that indicates to the STA3 at which moment (e.g., T3) it should start transmitting its block acknowledgment frame (e.g., BA 333). This way, the three STAs may be in doze state (low power state) from the time the STAs received the MU-PPDU 301 (e.g., at time T0) until its respective offset value. Then after the STA sends its BA frame, the STA can go back to a low power state until the next MU-PPDU (e.g., MU-PPDU 303) is sent at time T4.

In one or more embodiments, scheduling information delivered from an AP to an STA may be specific to an STA, and may include a BATT Start offset (e.g., time offsets T1, T2, T3), which may indicate a beginning of time slot provided by the PCP/AP 302 for an STA to transmit the STA's BA.

In one or more embodiments, scheduling information delivered from an AP to an STA may be specific to an STA, and may include a next PPDU Start offset (e.g., T4), which may indicate the moment when an STA should begin listening to/for the PCP/AP 302. At this moment, the PCP/AP 302 may either start transmitting the next MU PPDU in a current sequence of an MU-MIMO transmission or may transmit a BAR to an STA if a solicited BA was not received.

In one or more embodiments, to estimate the advantages of the acknowledgment and power save sequence 300 over existing techniques, a comparison may be conducted for both throughput and power save. The following assumptions were considered for the comparison. First, an amount of data (e.g., a PHY service data unit (PDSU)) for all STAs in MU-MIMO may be the same. Second, an AP may transmit each MU-MIMO stream using MCS 12 (e.g., 4620 Mbps). Third, BAR and BA may be transmitted using MCS 4 (e.g., 1155 Mbps). The results are shown in FIGS. 4A-4D.

It is understood that the above descriptions are for purposes of illustration and are not meant to be limiting.

FIGS. 4A-4D illustrate throughput 400 of an acknowledgment and power save sequence, in accordance with one or more example embodiments of the present disclosure.

Figure 4B:
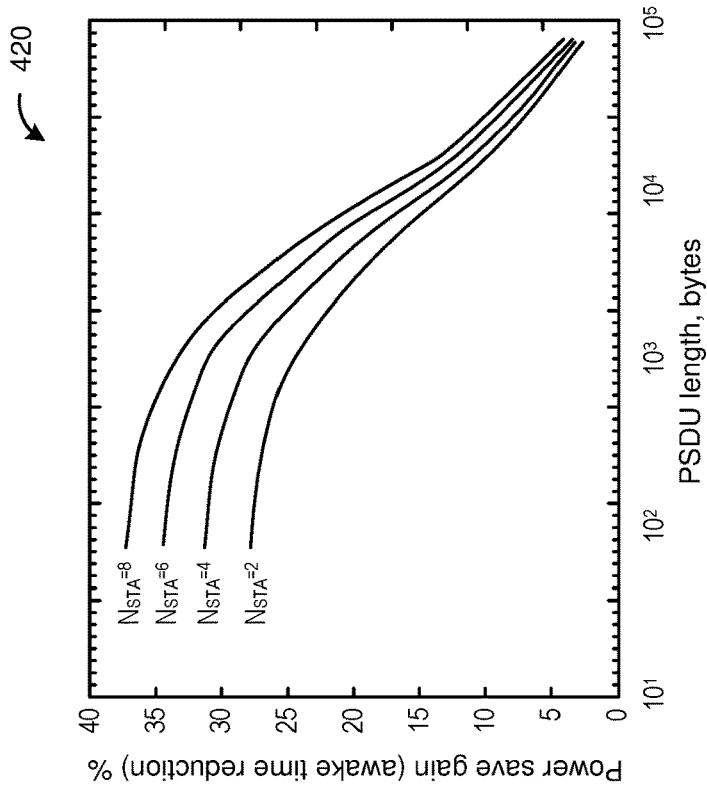
FIGS. 4A-4D illustrate throughput of an acknowledgment and power save sequence, in accordance with one or more example embodiments of the present disclosure.
Figure 4A:
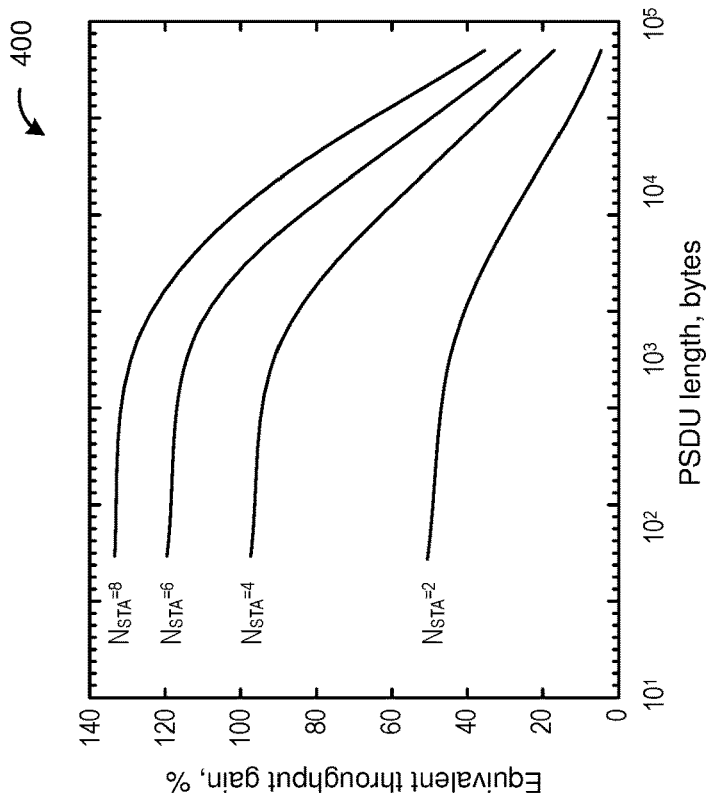

In one or more embodiments, performance comparison results for the case when each STA transmit BA of minimal size (e.g., 25+8 bytes) are demonstrated in FIGS. 4A and 4B. The graphs on FIGS. 4A and 4B may demonstrate an equivalent throughput gain (e.g., acknowledgment overhead may be taken into account) and power save gain (e.g., a reduction of awake time for all STAs in MU-MIMO) of the enhanced procedure over legacy procedures depending on the amount of data transmitted to each STA. Different curves of the graphs in FIGS. 4A and 4B may be related to a different number of STAs in MU-MIMO. The enhanced procedure may provide more than 100% gain for small and medium-size MU-MIMO frames transmission. Performance gains may be lower for cases in which acknowledgment overhead is lower (e.g., a small number of STAs in the MU group, and big size of data frames).

Figure 4D:
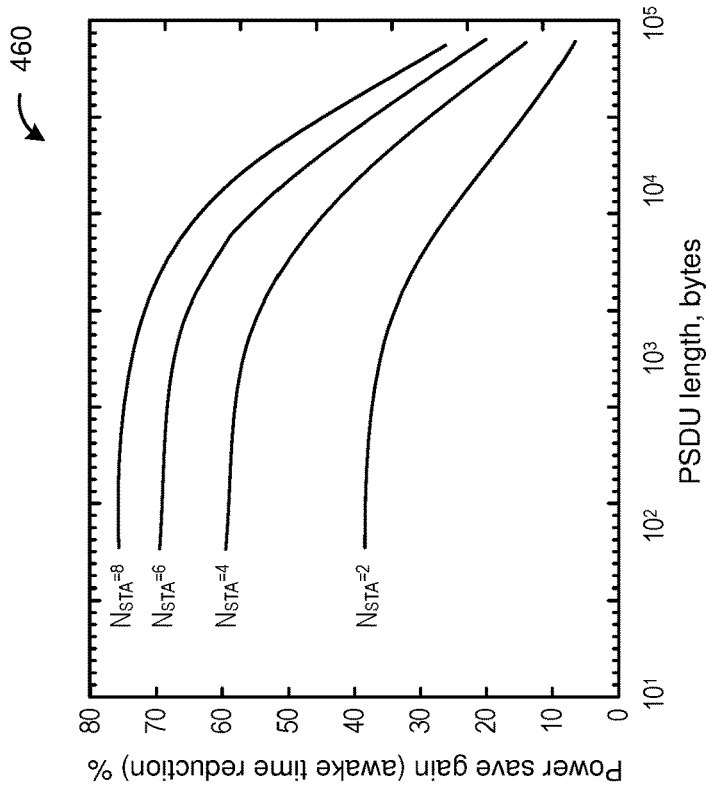
Figure 4C:
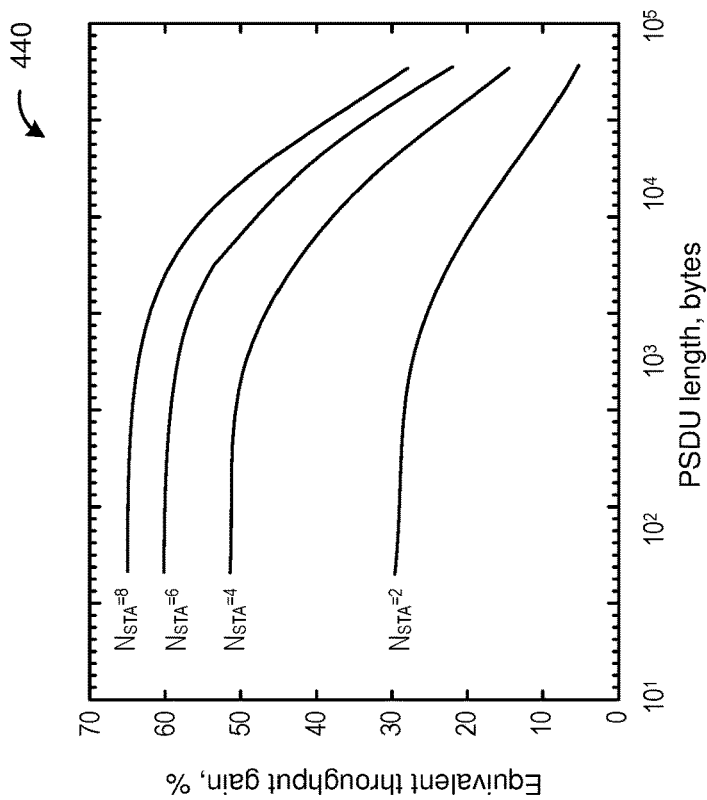

In one or more embodiments, FIGS. 4C and 4D may demonstrate the same metrics as FIGS. 4A and 4B, but each STA may transmit a BA of maximum size (e.g., 25+256 bytes). The larger BA may reduce BAR frame overhead in existing techniques, and may thereby improve throughput, albeit at a potentially lower gain than shown in FIGS. 4A and 4B. The use of a large BA may render existing power saves inaccurate and less effective because, for example, an assumption that all STAs may transmit the smallest possible BA. Therefore, FIGS. 4C and 4D may show improved power save gains, as the enhanced acknowledgment and power save procedure may reduce STA awake time by 75% in comparison with existing power save procedures.

It is understood that the above descriptions are for purposes of illustration and are not meant to be limiting.

Figure 5:
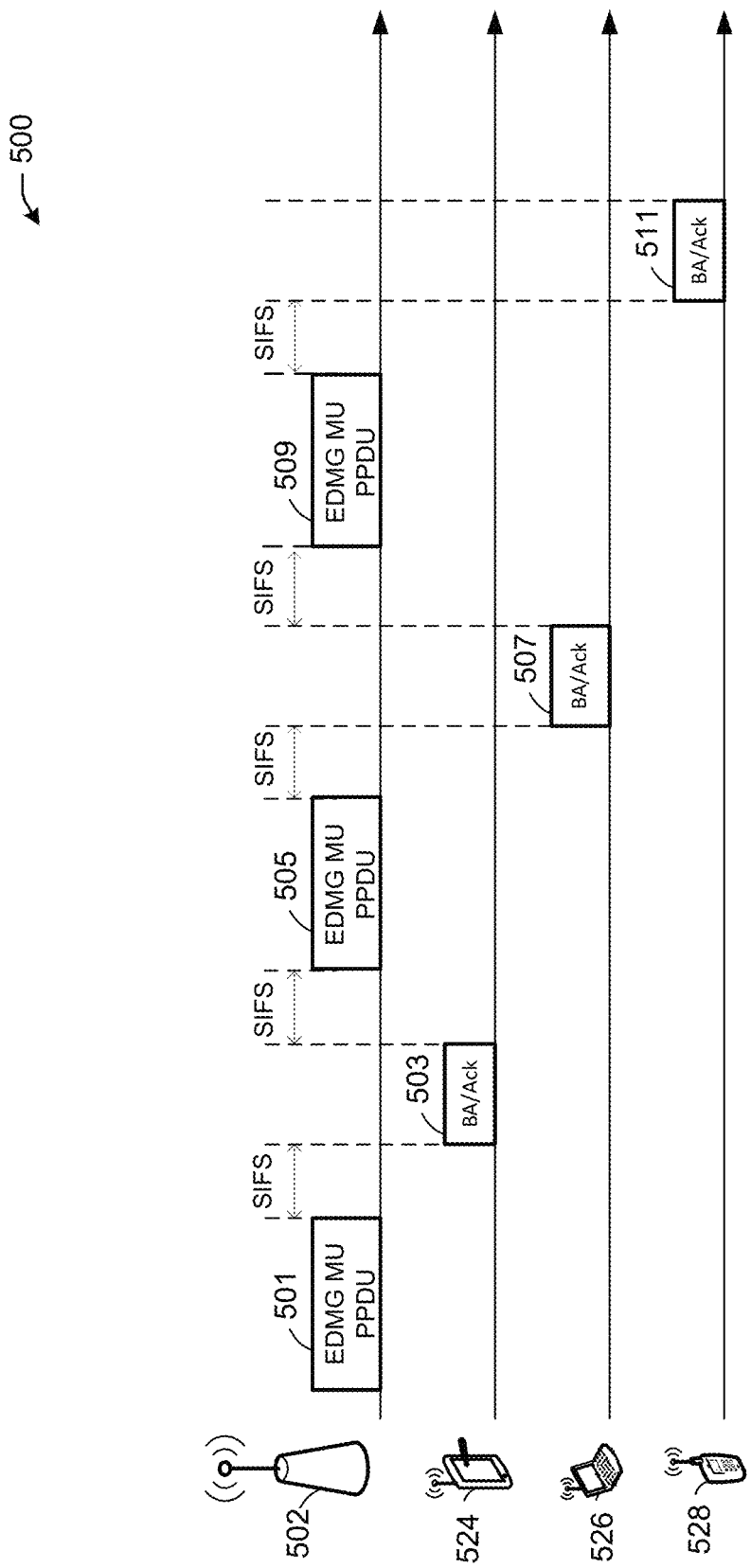
FIG. 5 illustrates a multi-user data sequence, in accordance with one or more example embodiments of the present disclosure.

FIG. 5 illustrates a multi-user data sequence 500, in accordance with one or more example embodiments of the present disclosure.

Referring to FIG. 5, there is a shown an AP 502 (e.g., also referred to herein "PCP/AP") that may be communicating with three STAs (user devices 524, 526, 528) in an MU-MIMO communication.

In one or more embodiments, a significant advantage of the enhanced acknowledgment and power save procedure may be that the enhanced procedure is more flexible than existing techniques. For example, the enhanced acknowledgment and power save procedure may allow an AP to avoid having to request a BA from each STA after the STAs receive each MU PPDU. The enhanced acknowledgment and power save procedure with MU-MIMO may allow the AP to elicit only one BA after each MU PPDU transmission, thereby reducing acknowledgment overhead and increasing system throughput. For example, the AP 502 may send an EDMG MU PPDU 501 to user device 524. The user device 524 may then respond with a BA/AC 503, without having to require a BAR frame from the AP 502. Similarly, the user devices 526 and 528, would also send their BA/ACKs (e.g., BA/ACKs 507 and 511 respectively), after receiving the respective EDMG MU PPDUs (e.g., EDMG PPDUs 505 and 509 respectively) from the AP 502.

In one or more embodiments, an estimation of maximum possible AP throughput may provide a vivid demonstration of the improvements using the enhanced acknowledgment and power save procedure. To perform such an estimation, the following assumptions may be used. First, STAs may send a BA of minimal length (e.g., 25+8 bytes). Second, eight STAs may be used in MU-MIMO. Third, EDMG single channel (SC) MCS 20 (e.g., 8662.5 Mbps) may be used for all STAs in MU-MIMO. Fourth, the channel bonding factor may be four.

In one or more embodiments, Table 1 below may demonstrate the maximum possible AP throughput for different amounts of transmitted data in a legacy (e.g., existing) flow, a proposed flow (e.g., the enhanced acknowledgment and power save procedure in which all eight STAs are requested to send a BA), and another embodiment of the enhanced acknowledgment and power save procedure (e.g., a "proposed flow+" in which only one STA is requested to send a BA).

TABLE 1

| | Maximum Possible Throughput | | |
|---|---|---|---|
| PSDU, bytes | AP Throughput (Legacy flow), Gbps | AP Throughput (Proposed flow), Gbps | AP Throughput (Proposed flow+), Gbps |
| 64 | 0.04 | 0.10 (+134%) | 0.35 (+758%) |
| 256 | 0.17 | 0.39 (+134%) | 1.41 (+755%) |
| 1024 | 0.66 | 1.54 (+133%) | 5.57 (+744%) |
| 4096 | 2.62 | 6.06 (+131%) | 21.02 (+702%) |
| 16384 | 10.20 | 22.74 (+123%) | 68.49 (+572%) |
| 65536 | 36.74 | 73.00 (+99%) | 157.34 (+328%) |

As shown in Table 1, the proposed flow together with additional acknowledgment overhead reduction may substantially increase the maximal possible throughput provided by an 802.11ay AP.

It is understood that the above descriptions are for purposes of illustration and are not meant to be limiting.

Figure 6A:
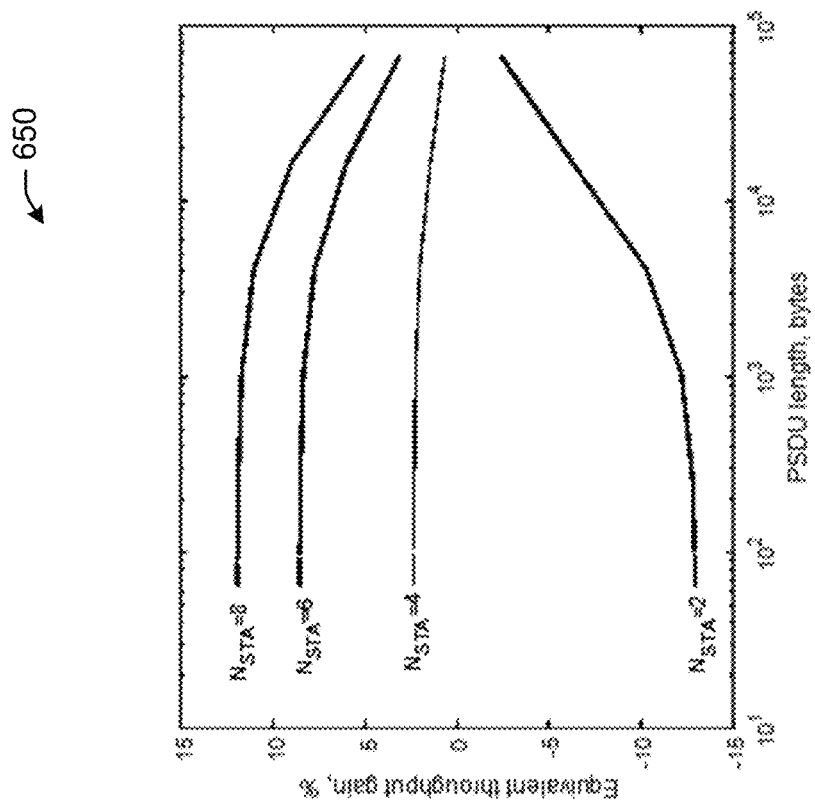
FIGS. 6A-6B illustrate throughput of a multi-user data sequence, in accordance with one or more example embodiments of the present disclosure.
Figure 6B:
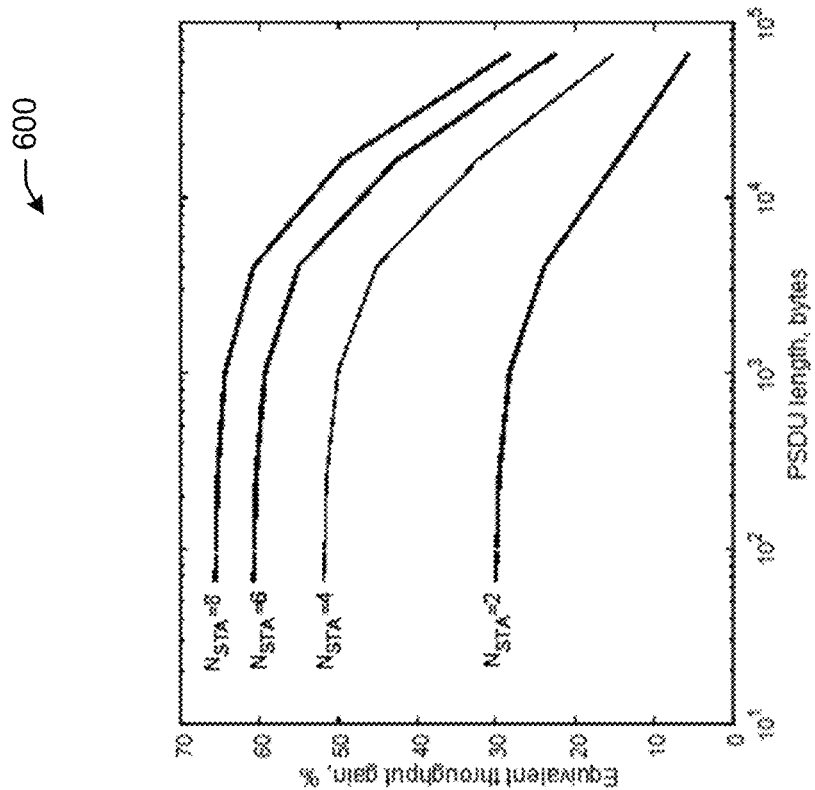

FIGS. 6A-6B illustrate the throughput of a multi-user data sequence, in accordance with one or more example embodiments of the present disclosure.

In one or more embodiments, scheduling information may not be transmitted to STAs by an AP but may be known by STAs based on a predefined rule. For example, a responder (e.g., STA) may estimate a start time for BA transmission by considering a specified order. STAs may transmit their BAs sequentially according to an order indicated in a header of the MU-MIMO frame, or according to a list describing the MU group (e.g., a Group ID Set element). Other responders (e.g., STAs) may transmit BAs of a fixed size using the lowest possible MCS. Estimating a BATT may include assuming that a first STA uses the longest BA type.

In one or more embodiments, FIGS. 6A and 6B may demonstrate the throughput gains provided by such a flow. In most cases, the enhanced acknowledgment and power save procedure may result in better throughput than existing legacy techniques. However, because of the assumption that all STAs may transmit the longest possible BA, some degradation may occur (e.g., when STAs actually transmit the shortest BA).

It is understood that the above descriptions are for purposes of illustration and are not meant to be limiting.

Figure 7A:
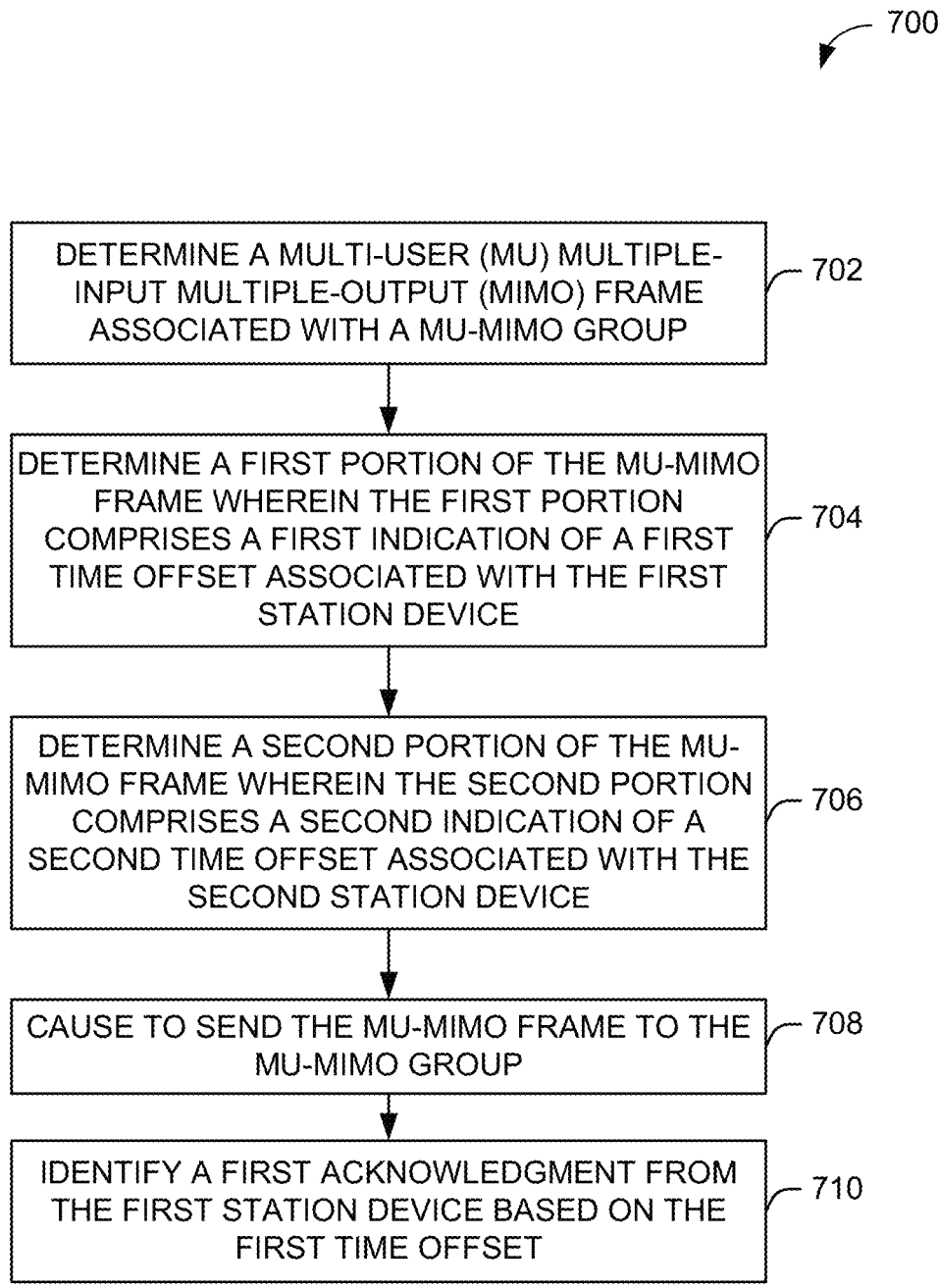
FIG. 7A depicts a flow diagram of an illustrative process for using enhanced acknowledgment and power save, in accordance with one or more example embodiments of the present disclosure.

FIG. 7A depicts a flow diagram of an illustrative process 700 for using enhanced acknowledgment and power save, in accordance with one or more example embodiments of the present disclosure.

At block 702, one or more processors of a device (e.g., user device 120 of FIG. 1A) may determine a multi-user (MU) multiple-input multiple-output (MIMO) frame associated with a MU-MIMO group.

At block 704, the one or more processors of the device may determine a first portion of the MU-MIMO frame associated with the first station device of the MU-MIMO group, wherein the first portion comprises a first indication of a first time offset associated with the first station device.

At block 706, the one or more processors of the device may determine a second portion of the MU-MIMO frame associated with the second station device of the MU-MIMO group, wherein the second portion comprises a second indication of a second time offset associated with the second station device.

At block 708, the one or more processors of the device may cause to send the MU-MIMO frame to the MU-MIMO group.

At block 710, the one or more processors of the device may identify a first acknowledgment from the first station device based on the first time offset.

It is understood that the above descriptions are for purposes of illustration and are not meant to be limiting.

Figure 7B:
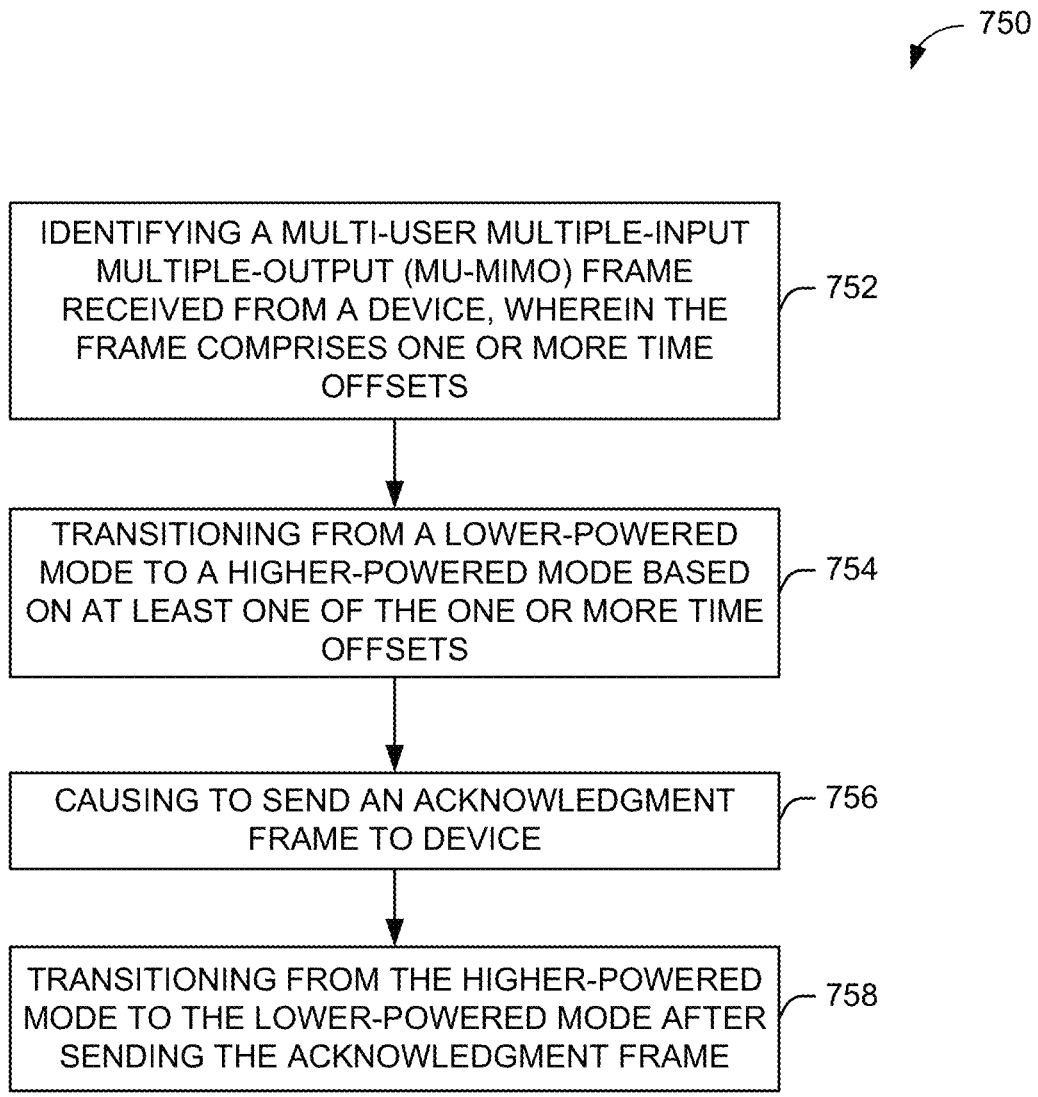
FIG. 7B depicts a flow diagram of an illustrative process for using enhanced acknowledgment and power save, in accordance with one or more example embodiments of the present disclosure.

FIG. 7B depicts a flow diagram of an illustrative process 750 for using enhanced acknowledgment and power save, in accordance with one or more example embodiments of the present disclosure.

At block 752, one or more processors of a device (e.g., AP 102 of FIG. 1A) may identify a multi-user multiple-input multiple-output (MU-MIMO) frame received from a device, wherein the frame comprises one or more time offsets.

At block 754, one or more processors of the device may transition from a lower-powered mode to a higher-powered mode based on at least one of the one or more time offsets.

At block 756, one or more processors of the device may cause to send an acknowledgment frame to device.

At block 758, one or more processors of the device may transition from the higher-powered mode to the lower-powered mode after sending the acknowledgment frame.

It is understood that the above descriptions are for purposes of illustration and are not meant to be limiting.

FIG. 8 shows a functional diagram of an exemplary communication station 800 in accordance with some embodiments. In one embodiment, FIG. 8 illustrates a functional block diagram of a communication station that may be suitable for use as an AP 102 (FIG. 1A) or a user device 120 (FIG. 1A) in accordance with some embodiments. The communication station 800 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 800 may include communications circuitry 802 and a transceiver 810 for transmitting and receiving signals to and from other communication stations using one or more antennas 801. The transceiver 810 may be a device comprising both a transmitter and a receiver that are combined and share common circuitry (e.g., communication circuitry 802). The communication circuitry 802 may include amplifiers, filters, mixers, analog to digital and/or digital to analog converters. The transceiver 810 may transmit and receive analog or digital signals. The transceiver 810 may allow reception of signals during transmission periods. This mode is known as full-duplex and may require the transmitter and receiver to operate on different frequencies to minimize interference between the transmitted signal and the received signal. The transceiver 810 may operate in a half-duplex mode, where the transceiver 810 may transmit or receive signals in one direction at a time.

The communications circuitry 802 may include circuitry that can operate the physical layer (PHY) communications and/or media access control (MAC) communications for controlling access to the wireless medium, and/or any other communications layers for transmitting and receiving signals. The communication station 800 may also include processing circuitry 806 and memory 808 arranged to perform the operations described herein. In some embodiments, the communications circuitry 802 and the processing circuitry 806 may be configured to perform operations detailed in FIGS. 2, 3, 4A, 4B, 4C, 4D, 5, 6A, 6B, 7A, and 7B.

In accordance with some embodiments, the communications circuitry 802 may be arranged to contend for a wireless medium and configure frames or packets for communicating over the wireless medium. The communications circuitry 802 may be arranged to transmit and receive signals. The communications circuitry 802 may also include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the communications circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device, read-only memory (ROM), random-access memory (RAM), magnetic disk storage media, optical storage media, flash memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touchscreen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASIC s), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device memory.

FIG. 9 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (i.e., drive unit) 916, a signal generation device 918 (e.g., a speaker), an enhanced acknowledgment and power saving device 919, a network interface device/transceiver 920 coupled to antenna(s) 930, and one or more sensors 928, such as a global positioning system (GPS) sensor, a compass, an accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

The enhanced acknowledgment and power saving device 919 may be configured to perform the operations detailed in FIGS. 2, 3, 4A, 4B, 4C, 4D, 5, 6A, 6B, 7A, and 7B.

It is understood that the above are only a subset of what the enhanced acknowledgment and power saving device 919 may be configured to perform and that other functions included throughout this disclosure may also be performed by the enhanced acknowledgment and power saving device 919.

While the machine-readable medium 922 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a single input single output (SISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth□, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
   determine a multi-user (MU) multiple-input multiple-output (MIMO) frame associated with a MU-MIMO group;
   determine a first indication included in the MU-MIMO frame, wherein the first indication is associated with a first station device of the MU-MIMO group, and wherein the first indication indicates a first time slot assigned to the first station;
   determine a second indication included in the MU-MIMO frame, wherein the second indication is associated with a second station device of the MU-MIMO group, and wherein the second indication indicates a second time slot assigned to the second station, wherein the first indication is different from the second indication, and wherein the first time slot is different from the second time slot, and wherein the first station device is different from the second station device;

cause to send the MU-MIMO frame to the MU-MIMO group;
identify a first acknowledgment from the first station device based on the first time slot; and
identify a second acknowledgement from the second station device based on the second time slot.

2. The device of claim 1, wherein the first time slot is assigned to the first station to send an acknowledgment after receiving the MU-MIMO frame.

3. The device of claim 1, wherein the first acknowledgment acknowledges that the first station device received the MU-MIMO frame.

4. The device of claim 1, wherein a portion of the MU-MIMO frame comprises a third time slot associated with a time to send a second MU-MIMO frame.

5. The device of claim 1, wherein the first time slot indicates to the first station device to enter an active mode after being in a doze state.

6. The device of claim 1, wherein the first acknowledgment is associated with a minimum modulation and coding scheme.

7. The device of claim 1, wherein the second acknowledgment acknowledges that the second station device received the MU-MIMO frame.

8. The device of claim 1, further comprising a transceiver configured to transmit and receive wireless signals.

9. The device of claim 8, further comprising an antenna coupled to the transceiver to cause to send the MU-MIMO frame.

10. A non-transitory computer-readable medium storing computer-executable instructions which when executed by one or more processors result in performing operations comprising:
determining a multi-user (MU) multiple-input multiple-output (MIMO) frame associated with a MU-MIMO group;
determining a first indication included in the MU-MIMO frame, wherein the first indication is associated with a first station device of the MU-MIMO group, and wherein the first indication indicates a first time slot assigned to the first station;
determining a second indication included in the MU-MIMO frame, wherein the second indication is associated with a second station device of the MU-MIMO group, and wherein the second indication indicates a second time slot assigned to the second station, wherein the first indication is different from the second indication, and wherein the first time slot is different from the second time slot, and wherein the first station device is different from the second station device;
causing to send the MU-MIMO frame to the MU-MIMO group;
identifying a first acknowledgment from the first station device based on the first time slot; and
identifying a second acknowledgement from the second station device based on the second time slot.

11. The non-transitory computer-readable medium of claim 10, wherein the first time slot is assigned to the first station to send an acknowledgment after receiving the MU-MIMO frame.

12. The non-transitory computer-readable medium of claim 10, wherein the first acknowledgment acknowledges that the first station device received the MU-MIMO frame.

13. The non-transitory computer-readable medium of claim 10, wherein a portion of the MU-MIMO frame comprises a third time slot associated with a time to send a second MU-MIMO frame.

14. The non-transitory computer-readable medium of claim 10, wherein the first time slot indicates to the first station device to enter an active mode after being in a doze state.

15. The non-transitory computer-readable medium of claim 10, wherein the first acknowledgment is associated with a minimum modulation and coding scheme.

16. The non-transitory computer-readable medium of claim 10, wherein the second acknowledgment acknowledges that the second station device received the MU-MIMO frame.

17. A method comprising:
determining, by one or more processors, a multi-user (MU) multiple-input multiple-output (MIMO) frame associated with a MU-MIMO group;
determining a first indication included in the MU-MIMO frame, wherein the first indication is associated with a first station device of the MU-MIMO group, and wherein the first indication indicates a first time slot assigned to the first station;
determining a second indication included in the MU-MIMO frame, wherein the second indication is associated with a second station device of the MU-MIMO group, and wherein the second indication indicates a second time slot assigned to the second station, wherein the first indication is different from the second indication, and wherein the first time slot is different from the second time slot, and wherein the first station device is different from the second station device;
causing to send the MU-MIMO frame to the MU-MIMO group;
identifying a first acknowledgment from the first station device based on the first time slot; and
identifying a second acknowledgement from the second station device based on the second time slot.

18. The method of claim 17, wherein the first time slot is assigned to the first station to send an acknowledgment after receiving the MU-MIMO frame.

19. The method of claim 17, wherein the first acknowledgment acknowledges that the first station device received the MU-MIMO frame.

20. The method of claim 17, wherein a portion of the MU-MIMO frame comprises a third time slot associated with a time to send a second MU-MIMO frame.

* * * * *